UNITED STATES PATENT OFFICE 2,630,417

TETRAFLUOROETHYLENE POLYMER COMPOSITIONS CONTAINING CHLORINATED LUBRICANTS

John Frank Lontz, Nutley, N. J., assignor to E. I. du Pont de Nemours and Company, Wilmington, Del., a corporation of Delaware No Drawing. Application June 30, 1950, Serial No. 171,535

7 Claims. (Cl. 260—31.2)

This invention relates to new compositions comprising coagulated tetrafluoroethylene polymer and chlorinated lubricants.

It has been previously proposed to prepare finely divided polytetrafluoroethylene dispersed in various organic media as well as in aqueous suspension. Although useable, these forms of polytetrafluoroethylene and compositions prepared therefrom have not been entirely satisfactory for extrusion and coating applications. The previously known methods for shaping polytetrafluoroethylene required long processing cycles at temperatures above 327° C., and in many instances resulted in the development of flaws and fractures in the shaped articles.

It is, therefore, an object of this invention to provide new compositions based on tetrafluoroethylene polymer which are readily adapted to be extruded, coated, calendered, and molded. Another object is to provide new and useful lubricated polytetrafluoroethylene compositions which are non-inflammable and possess high-grade dielectric properties, and which are particularly valuable for electrical insulating applications. A further object is to provide lubricated polytetrafluoroethylene compositions in the form of a dry molding powder and methods for preparing same. Other objects will be apparent from the description of the invention given below.

The above objects are accomplished according to this invention by the provision of non-aqueous pressure-coalescing compositions comprising discrete colloidal-sized particles of tetrafluoroethylene polymer, which in particular embodiments have been coagulated from an aqueous colloidal suspension of the polymer, intimately admixed with a nuclear-chlorinated aromatic compound containing 15% to 65% chlorine by weight and having a melting point of —20° C. to 150° C. and a boiling point below 450° C. at atmospheric pressure, said chlorinated compound being present in an amount of 5% to 50% based on the combined weight of said polymer and chlorinated compound. The preferred nuclear-chlorinated aromatic compounds of this invention are those having a boiling point of 100° C. to 450° C., and which are selected from the group of nuclear-chlorinated aromatic hydrocarbons, nuclear-chlorinated aromatic phenols, and the nuclear-chlorinated aromatic esters. The preferred proportion of nuclear-chlorinated aromatic compound varies from 15% to 30%, based upon the combined weight of the tetrafluoroethylene polymer and chlorinated compound. Still more preferably, the chlorinated compound is a chlorinated biphenyl containing 42% to 60% chlorine by weight, having a boiling point of 270° C. to 420° C. at atmospheric pressure, and a viscosity of 34–82 Saybolt Seconds Universal (SSU) at 98.9° C.

Whereas the invention will be described chiefly with respect to polytetrafluoroethylene (i. e., tetrafluoroethylene homopolymer), it is to be understood that the invention also applies to other tetrafluoroethylene polymers. Thus, tetrafluoroethylene copolymers comprising the polymerization product of a mixture of tetrafluoroethylene and another unsaturated organic compound (e. g., ethylene and chlorotrifluoroethylene) containing a terminal ethylenic double bond, said organic compound being copolymerizable with tetrafluoroethylene and being present in said mixture in an amount of up to 15% of the combined weight of tetrafluoroethylene and said organic compound, may be employed in place of polytetrafluoroethylene, provided the presence of the other compounds do not destroy the essential and characteristic qualities of the colloidal particles. Also there may be employed tetrafluoroethylene polymers in which the end groups of the polymer chain are supplied by non-polymerizable compounds (e. g., methanol and ethanol) which are present during the polymerization reaction. The tetrafluoroethylene polymers employed in the practice of the present invention embrace the above three types of polymers, it being understood that all the tetrafluoroethylene polymers of this invention possess a high degree of polymerization and a sintering temperature of at least 300° C. Above the sintering temperature such polymers form a gel but they do not actually melt to a liquid. This is in contrast to the known relatively low molecular weight polymers derived from tetrafluoroethylene and certain tetrafluoroethylene polymer waxes, both of which have sharp melting points.

The dry, non-aqueous, lubricated polymer compositions of this invention which may be prepared by various methods described hereinafter, vary from putty-like masses to pulverulent solids, depending upon the amount and type of nuclear-chlorinated aromatic compound (hereinafter referred to as chlorinated lubricant) employed. The compositions as prepared are suitable for directly extruding, calender-rolling, coating, molding, or otherwise fabricating into finished articles without any further special treatment.

The following examples illustrate specific embodiments of this invention. All parts are by weight, unless otherwise specified, and all aqueous colloidal polymer suspensions were prepared as described in U. S. application Serial No. 107,137, filed July 27, 1949, by K. L. Berry. The latter application discloses the polymerization of tetrafluoroethylene at 0° C. to 100° C. in an aqueous medium in the presence of a water-soluble polymerization catalyst such as disuccinic acid peroxide, i. e. $(HOOCCH_2CH_2COO)_2$, and an alkali metal or ammonium salt of an acid of the formula $H(CF_2CF_2)_{3\ to\ 10}COOH$. These acids are obtainable by oxidizing, with a permanganate oxidizing agent, a polyfluoroalkanol of the formula $H(CF_2CF_2)_{3 \text{ to } 10}CH_2OH$. The latter compounds are in turn formed by polymerization of tetrafluoroethylene in the presence of methanol and an organic peroxide catalyst at a temperature between 75° C. and 350° C., as disclosed in U. S. application Serial No. 65,063, filed December 13, 1948, by R. M. Joyce.

*Example 1.*—The dried colloidal polytetrafluoroethylene for use in this example is obtained by vigorously stirring a concentrated aqueous colloidal suspension of the polymer, followed by filtering, and drying the coagulated polymer at 110° C. The chlorinated lubricant employed is chlorinated biphenyl, which is really a mixture of chlorinated biphenyls commercially known as "Aroclor" 1260, and has a chlorine content of 60%, a boiling point range of 385° to 420° C., and a viscosity of 70–82 SSU at 98.9° C. Seventy-five parts of the dried colloidal polytetrafluoroethylene is mixed with 25 parts of the above chlorinated biphenyl dissolved in 396 parts of acetone. The resulting slurry is stirred for 5 minutes in a Waring Blendor. The acetone is then boiled off on a steam bath, leaving a gel-like mass.

The gel-like mass is next fed to an 8-inch calendering roll (Thropp Mill), and is rolled at room temperature into an almost transparent sheet, the thickness of which may be varied depending upon the adjustment of the rolls. In its unfused form, this sheeting has an unusual degree of toughness and upon baking for one hour at 350° C. it is transformed to a completely fused transparent sheet having greater toughness than the unfused sheet.

*Example 2.*—A lubricated polytetrafluoroethylene composition is prepared by the same procedure as that described in Example 1, except the following amounts of ingredients are substituted: 89 parts of dried colloidal polytetrafluoroethylene, and 11 parts of 2,3,4,6-tetrachlorophenol (known commercially as "Dowicide" 6, containing 61.5% chlorine and having a melting point of 50° C. and a boiling point of 135° to 168° C. at 8–10 mm. Hg) dissolved in 366 parts of toluene.

The dried lubricated polymer composition is fed to an 8-inch calendering roll, and rolled at room temperature into a thin sheet as described in Example 1. This sheet was then baked for 1 hour at 350° C., which resulted in a thin, transparent, tough sheet useful as an electrical insulating wrapping tape.

*Example 3.*—The chlorinated lubricant employed in this example is a mixture of chlorinated biphenyls known commercially as "Aroclor" 1242, having a chlorine content of 42%, a boiling point range of 322° to 365° C., and a viscosity of 34–34.6 SSU at 98.9° C. One hundred twenty-five parts of a 60% solids aqueous colloidal suspension of polytetrafluoroethylene (75 parts polymer and 50 parts water) is extended with 167 parts of distilled water. To this is added 25 parts of the above "Aroclor" 1242, and the mixture is whipped in a Waring Blendor while a mixture of 83 parts water and 66 parts acetone is added to coagulate the dispersed polymer. After approximately 3 minutes of agitation following the completed addition of the aqueous acetone, the lubricated coagulated polymer is filtered under strong suction and dried at 110° C. to expel any occluded water.

For filament extrusion, the dried lubricated polymer composition is placed in an extrusion chamber fitted with an hydraulically-operated piston which forces the lubricated polymer through a circular die tapered to 0.040 inch opening. The extrusion is carried out at ordinary room temperature (25° to 30° C.), using an applied pressure of approximately 2,000 lbs. on a 1.25-inch diameter ram. The extruded monofilament is next passed between a pair of calendering rolls to form a tape ½-inch wide and 0.006-inch thick. This tape is then freed of the lubricant by immersing in toluene which serves as an extracting solvent. The lubricant-free tape is sintered by passing through a heated pipe, 1-inch in inside diameter, and electrically heated to an inner air temperature of 350° to 380° C. The resulting tape has a nearly transparent typical bluish appearance. On testing, this tape exhibits an average tensile strength of 6380 lbs./sq. in. and an average elongation of 353%, as determined by ASTM test method D–412–41. The tape made by this method is useful as a dielectric insulation for such electrical components as cables, coils, armatures, and the like.

*Example 4.*—As the chlorinated lubricant in this example there is used di-n-propyl tetrachlorophthalate, which is commercially known as "Plastofries" No. 62, containing approximately 36.5% chlorine, and which is a liquid at room temperature and has a boiling point of 170° to 175° C. at 1 mm. Hg. Seventy-five parts of dried coagulated polytetrafluoroethylene, obtained as described in Example 1, is mixed with 25 parts of the above "Plastofries" No. 62 dissolved in 396 parts of acetone. The resulting slurry is stirred for 5 minutes in a Waring Blendor. The acetone is then boiled off on a steam bath leaving a gel-like mass.

The lubricated polymer mass is then fed to an 8-inch calendering roll (Thropp Mill), and the mass is rolled at room temperature into a white, opaque, flexible sheet, the thickness of which may be varied depending upon the adjustment of the rolls. In its unsintered form this sheet has an unusual degree of toughness, and upon baking at 350° C. it is transformed to a completely sintered transparent sheet of greater toughness than the unsintered sheet.

The tetrafluoroethylene polymer for use in this invention is obtainable by coagulating an aqueous colloidal suspension of the polymer. It has been found that other finely divided forms of polytetrafluoroethylene, such as the granular form obtained by direct polymerization in accordance with U. S. Patents 2,230,654, 2,393,967, and 2,394,243, the micro-pulverized form, or any other form which has been mechanically subdivided from the massive polymer cannot be readily extruded or molded under pressure to yield satisfactory articles. For example, when the granular form of polytetrafluoroethylene prepared according to the above patents and then micro-pulverized to small particles is mixed with the chlorinated biphenyls of this invention, the mixture extrudes into shreds with no continuity. The chlorinated biphenyl actually exudes from the granular polymer mixture upon application of slight pressure. Granular polymer/chlorinated biphenyl mixtures are quite different from the corresponding coagulated colloidal polymer/chlorinated biphenyl mixtures in that the former show no pressure-coalescing property when pressed on a flat surface, whereas the pressure-coalescing property is characteristic of the latter compositions.

The process of preparing the aqueous suspension of tetrafluoroethylene polymer is not the subject of this invention. However, suitable aqueous suspensions of polytetrafluoroethylene may be obtained by the methods described in U. S. Serial No. 713,385 filed November 30, 1946, by M. M. Renfrew; U. S. Serial No. 107,137, filed July 27, 1949, by K. L. Berry, and U. S. Patent 2,478,229. Aqueous suspensions of tetrafluoroethylene copolymers may be obtained by the methods described in U S. Serial No. 107,137, filed July 27, 1949, by K. L. Berry. Aqueous suspensions of tetrafluoroethylene polymers in which the end groups of the polymer chain are supplied by non-polymerizable compounds may be obtained by the same method as that described for the preparation of the polytetrafluoroethylene suspension as typified by batch D of Example X in U. S. Serial No. 107,137, filed July 27, 1949, by K. L. Berry, except that, for example, 0.075 part of methanol as the non-polymerizable compound is added with the other reactants to the pressure vessel prior to polymerization. The particle size of the polymer evidently is rather highly critical, i. e. it should be colloidal before coagulation, and the smaller the particles the more easily the lubricated composition may be fabricated into articles. The particle size of the polymer in the suspensions described in the above-mentioned applications and patent in general ranges from 0.05 to 5 microns, which is the diameter of the average particle determined by an electron microscope measurement on a dried film obtained by depositing a highly diluted aqueous suspension of the polymer on a surface. These colloidal suspensions have been found quite suitable for coagulation in preparing the compositions of this invention. The colloidal particles of polytetrafluoroethylene retain their particulate form during coagulation although agglomeration may occur to some extent, whereby individual particles attach themselves to other particles without necessarily losing their identity, but this does not affect their ability to be fabricated when combined with the chlorinated lubricants of this invention. The coagulated mass is thus a characteristic physical form of the polytetrafluoroethylene. Moreover, polytetrafluoroethylene is virtually insoluble in practically all known solvents, and therefore the particles do not coalesce when merely suspended in organic media. To coalesce the particles in the composition of this invention it is necessary to subject them to the action of heat and/or pressure. The colloidal particles possess marked adsorptive properties, and can be employed as adsorbents for the chlorinated lubricants of this invention. In this respect the colloidal form of polytetrafluoroethylene differs from other finely divided forms of the polymer.

The chlorinated compounds to act as lubricants in the compositions of this invention should have certain physical properties and chemical structures, which to a large extent are based on the ability of the lubricated polymer composition to be extruded under pressure at relatively low temperatures without exudation of the lubricant. Thus, the chlorinated compounds should be nuclear-chlorinated aromatic compounds (i. e., all of the chlorine atoms should be attached directly to aromatic nuclei, although there may be aliphatic substituents in the molecule, but these should contain no chlorine atoms), containing from 15% to 65% chlorine by weight, and should have a melting point of —20° C. to 150° C. and a boiling point below 450° C. at atmospheric pressure. More specifically, better lubricants are found in the group of nuclear-chlorinated aromatic compounds having a boiling point of 100° to 450° C., and particularly from the group of nuclear-chlorinated aromatic hydrocarbons, nuclear-chlorinated aromatic phenols, and nuclear-chlorinated aromatic esters. The most desirable all-purpose chlorinated lubricants of this invention are the chlorinated biphenyls, which are generally available only as commercial mixtures of different isomeric chlorinated biphenyls obtanied by chlorination of biphenyl. Insofar as lubrication and extrudability in this invention is concerned it does not matter whether the chlorinated compound is a single compound or a mixture of compounds, or whether it is liquid or solid at room temperature and atmospheric pressure, provided the indicated physical properties and chlorine content specifications are met, but in any case the chlorinated compound should be liquid under the extrusion or other fabricating conditions employed. The preferred chlorinated biphenyls are those having a chlorine content of 42% to 60% chlorine by weight, a boiling point of 270° to 420° C. at atmospheric pressure, and a viscosity of 34–82 Saybolt Seconds Universal (SSU) at 98.9° C. These preferred chlorinated biphenyls vary from mobile oils to soft sticky resins. Some of the chlorinated biphenyls containing more than 65% chlorine are crystalline solids which do not lubricate the polytetrafluoroethylene of this invention under the conditions prevailing in most commercial extrusion applications. Hence, these higher chlorinated biphenyls are outside the scope of this invention, since when used with the colloidal polymer, the compositions extrude very poorly, yielding articles having irregular shapes, fissures, and non-uniform caliper. Examples of the preferred chlorinated biphenyl mixtures include those commercially available under the designation of "Aroclor" 1219, 1242, 1248, 1254, 1260, and 1262, wherein the last two digits of each number designate the approximate chlorine content in per cent by weight. Other chlorinated lubricants falling within the preferred subgeneric group of nuclear-chlorinated aromatic hydrocarbons, nuclear-chlorinated aromatic phenols, and nuclear-chlorinated aromatic esters include the following:

1,2-dichlorobenzene
1,4-dichlorobenzene
1,3,5-trichlorobenzene
Monochloronaphthalenes
1,2-dichloronaphthalene
1,4-dichloronaphthalene
Mixed chlorinated naphthalenes:
    "Halowax" Oil #1000
    "Halowax" #1012
    "Halowax" #1013
    "Halowax" #1014
2-chlorobiphenyl
4-chlorobiphenyl
3-chloro-4-hydroxybiphenyl ("Dowicide" 4)
2 4,5-trichlorophenol ("Dowicide" 2)
2,4,6-trichlorophenol ("Dowicide" 25)
Monochloro-2-hydroxybiphenyl ("Dowicide" 3)
2,3,4,6-tetrachlorophenol ("Dowicide" 6)
Di-n-propyl tetrachlorophthalate
Di-n-amyl tetrachlorophthalate
Di-2-ethylhexyl tetrachlorophthalate
Di-n-decyl tetrachlorophthalate
Methyl tetrachlorobenzoate
n-Butyl tetrachlorobenzoate
Benzyl tetrachlorobenzoate All of the chlorinated compounds or mixtures thereof specifically recited above are reported in the literature or are commercially available. It is preferred to use one or a mixture of commercially available mixtures of the chlorinated compounds since these are cheaper than the pure compounds, although both are equivalents insofar as extrudability is concerned.

The proportion of chlorinated lubricant in the compositions of this invention is critical. Thus, compositions containing more than 50% of chlorinated lubricant are too fluid for such forming operations as extrusion, calendering, and molding in that they do not retain their own form under pressure. This means the flow of the compositions cannot be controlled under pressure to give accurate tolerances in the fabricated article. Less than 5% chlorinated lubricant is ineffective in producing sufficient lubrication of the polytetrafluoroethylene for extruding or otherwise fabricating articles at commercially satisfactory rates at the relatively low temperature contemplated. It is preferred to use 15% to 30% of the chlorinated lubricant since proportions within this range yield compositions which possess optimum properties for processing into various articles by extruding, molding, calendering, coating, and the like. All percentages of the chlorinated lubricant are based on the combined weight of chlorinated lubricant and tetrafluoroethylene polymer in the composition, the polymer weight being calculated on a dry basis.

The compositions of this invention may be prepared by a variety of methods. One such method comprises intimately mixing the liquid chlorinated lubricant (or a solution of the solid chlorinated lubricant in an organic solvent) with an aqueous suspension of colloidal polytetrafluoroethylene under high speeds of agitation with or without a dispersing agent, followed by coagulation accomplished by the addition of either an electrolyte or a water-miscible organic liquid such as acetone or alcohol. In this method it is preferred to use one of the many suitable dispersing agents disclosed in U. S. Patent 2,478,229. An equally satisfactory method for obtaining the compositions involves coagulating an aqueous suspension of colloidal polytetrafluoroethylene, drying the coagulated polymer, suspending the coagulated polymer in an organic liquid vehicle, examples of which are methanol and tertiary butanol, and then adding the chlorinated lubricant if liquid or a solution of the solid chlorinated lubricant with continuous stirring, followed by filtering or evaporation of the suspending vehicle. A third method comprises spraying a mist of the chlorinated lubricant or solution thereof onto the dry coagulated polymer particles while the particles are being tumbled in a blender. A fourth method employs highspeed agitation of the coagulated dried colloidal polymer in the presence of the liquid chlorinated lubricant, or solution of solid chlorinated lubricant, followed by removal of solvents when used. The only requirement for preparing satisfactory compositions is to thoroughly and intimately disperse the chlorinated lubricant throughout the particles of the coagulated polymer.

Other materials may be incorporated in the compositions of this invention depending upon the properties desired in the finished articles fabricated from the compositions. Thus, it has been found that finely divided solid fillers, pigments, dyes, other lubricants, stabilizers, plasticizers, and the like may be added to the compositions in varying amounts. Examples of suitable fillers and pigments which may thus be employed include carbon black, graphite, mica, talc, silica, asbestos, and titanium dioxide. All of these fillers and pigments should be in finely divided form and preferably should be of the approximate particle size of the polymer used in the mixture. The fillers and pigments may be employed in amounts varying from relatively small amounts up to as much as 400%, based on the dry weight of the tetrafluoroethylene polymer in the composition. All of these additional modifiers may be incorporated in the composition at any time prior to fabrication into the finished article. However, the preferred method for incorporating fillers and pigments involves coagulating the aqueous colloidal polymer suspension in the presence of the dispersed fillers, pigments and chlorinated lubricant. The fillers and pigments serve either to color the polymer or to extend and reinforce the polymer, resulting in mixtures having increased elongation in some cases and in mixtures having a lower cost where a cheap filler is employed. However, if the best electrical properties inherent in the polytetrafluoroethylene are desired, it will generally not be practical to employ large amounts of these other additives.

The chief advantage of this invention is that the polytetrafluoroethylene compositions may readily be extruded at relatively low temperatures (i. e., at 15°–150° C. and higher, if desired) under compacting pressure into various shapes at rates up to approximately 50 feet per minute, whereas prior to this invention, melt-extrusion rates were limited to approximately 50 feet per hour at much higher temperatures. These extruded shapes may best be freed from the chlorinated lubricants by extracting with a solvent, although in some cases the chlorinated lubricants may be volatilized. The shaped articles, whether extruded, molded or otherwise fabricated, are usually baked at a temperature above 327° C. until sintered, and thereafter are annealed or quenched. The processing conditions for extruding articles from lubricated colloidal polytetrafluoroethylene are more fully described in U. S. Serial No. 171,534 of Llewellyn and Lontz, filed June 30, 1950, and in general, the same processing conditions described therein may be used in this invention when it is desired to extrude colloidal polytetrafluoroethylene compositions containing the chlorinated lubricants.

An important advantage of the chlorinated lubricants of this invention not possessed by the hydrocarbon lubricants, the polyorganosiloxane lubricants, and high-boiling, non-chlorinated ester lubricants lies in the fact that these chlorinated lubricants and particularly the preferred chlorinated biphenyls when combined with the colloidal polytetrafluoroethylene as hereinbefore described produce a lubricated polymer which is non-inflammable and possesses high-grade dielectric properties, and hence, is very attractive for many large-scale operations where a lubricated polymer mixture both stable and non-inflammable even at high temperatures is desired. Among such applications for which the compositions of this invention are particularly suitable are extruded electrical insulation, molded electrical parts, coated and laminated glass fabrics and potting compounds. In some applications such as in the case of the potting compounds, the lubricated polymer may be used as such without need for sintering the mixture or removal of the chlorinated lubricant. The chlorinated lubricants are especially useful for high temperature extrusion and rolling of colloidal polytetrafluoroethylene because of their non-inflammable character. They do not ignite, for instance, when volatilized at temperatures near the fusion point of polytetrafluoroethylene (i. e., 327° C.), thereby allowing considerably more latitude in fabrication than is permissible with the hydrocarbon lubricants, which sometimes require special volatilizing chambers to avoid fire hazards.

Another important application for the compositions of this invention involves a simplified method for joining spliced sections of polytetrafluoroethylene coated wire conductors. This method involves the steps of wrapping the spot to be spliced with one or more layers of unsintered lubricated polytetrafluoroethylene tape extruded from one of the lubricated compositions of this invention, and thereafter heating the resulting assembly above 327° C. to sinter the whole and effect bonding to the conductor and its coating. The same wrapping technique may be applied to the covering of other metal articles such as iron magnets, coils, and the like, where it is desired to cover the article with a chemically inert, corrosion-resistant, electrical insulating covering.

The compositions of this invention are useful for extrusion into various forms such as filaments, beading, films, sheets, tubes, rods, tapes; extrusion coatings on wires, calender-rolling into sheets; coating and calendering over paper, cloth, foil, asbestor, porous ceramics, glass cloth, metal screens and the like; and for molding into various articles such as gaskets. Another suitable application involves use of the compositions for bonding or repairing sections of polytetrafluoroethylene film or sheeting. For example, several sections of an unbaked, unsintered sheet extruded from one of the lubricated polymer compositions of this invention may be lapped and securely bonded to give satisfactory bonds.

I claim:

1. A non-aqueous pressure-coalescing composition comprising tetrafluoroethylene polymer particles of colloidal size intimately admixed with a nuclear-chlorinated aromatic compound containing from 15% to 65% by weight of chlorine and having a melting point within the range of —20° C. to 150° C. and a boiling point below 450° C. at atmospheric pressure, said tetrafluoroethylene polymer containing more than 85% by weight of polymerized tetrafluoroethylene, said chlorinated compound being present in an amount equal to from 5% to 50% of the combined weight of the said tetrafluoroethylene polymer and chlorinated compound.

2. The composition of claim 1 in which the said nuclear-chlorinated aromatic compound is a nuclear-chlorinated aromatic hydrocarbon.

3. The composition set forth in claim 1 in which the said nuclear-chlorinated aromatic compound is a nuclear-chlorinated aromatic phenol.

4. The composition set forth in claim 1 in which the said nuclear-chlorinated aromatic compound is a nuclear-chlorinated aromatic ester.

5. The compositiom set forth in claim 1 in which the quantity of nuclear-chlorinated aromatic compound is within the range of 15% to 30% of the combined weight of the tetrafluoroethylene polymer and chlorinated compound.

6. A non-aqueous pressure-coalescing composition which comprises coagulated polytetrafluoroethylene particles of colloidal size, obtained by coagulation from an aqueous colloidal suspension of polytetrafluoroethylene, intimately admixed with a chlorinated biphenyl containing 42% to 60% of chlorine by weight, said chlorinated biphenyl having a boiling point of 270° to 420° C. at atmospheric pressure, and a viscosity of 34 to 82 Saybolt Seconds Universal at 98.9° C.

7. Polytetrafluoroethylene sheet material containing a chlorinated biphenyl lubricant for the polytetrafluoroethylene, said polytetrafluoroethylene being in the form of discrete colloidal sized particles intimately admixed with the said chlorinated biphenyl.

JOHN FRANK LONTZ.

REFERENCES CITED

The following references are of record in the file of this patent:

UNITED STATES PATENTS

| Number | Name | Date |
| --- | --- | --- |
| 2,230,654 | Plunkett | Feb. 4, 1941 |
| 2,484,483 | Berry | Oct. 11, 1949 |
| 2,510,112 | Holbrook | June 6, 1950 |